United States Patent [19]

Irwin

[11] Patent Number: 4,816,957
[45] Date of Patent: Mar. 28, 1989

[54] GROUND LINE FAULT INTERRUPTER ADAPTER UNIT

[76] Inventor: Lawrence F. Irwin, 12860 San Fernando Rd., Sylmar, Calif. 91342

[21] Appl. No.: 90,046
[22] Filed: Aug. 27, 1987
[51] Int. Cl.[4] .............................................. H02H 3/16
[52] U.S. Cl. ....................................... 361/45; 335/18; 361/49
[58] Field of Search ....................... 361/42, 44, 45, 49; 335/18; 324/509, 510

[56] References Cited

U.S. PATENT DOCUMENTS

| | | | |
|---|---|---|---|
| 4,002,951 | 1/1977 | Halbeck | 361/45 |
| 4,079,344 | 3/1978 | Lauben et al. | 361/45 X |
| 4,216,516 | 8/1980 | Howell | 361/44 X |
| 4,348,708 | 9/1982 | Howell | 361/45 |
| 4,563,997 | 2/1986 | Bienwald et al. | 361/45 |

*Primary Examiner*—A. D. Pellinen
*Assistant Examiner*—Derek S. Jennings
*Attorney, Agent, or Firm*—James E. Brunton

[57] ABSTRACT

An adapter unit comprising a moisture resistant housing within which is carried an improved, self testing ground line fault interrupter device. The improved device is electrically interconnected with a connector carried externally of the adapter housing so that the unit can be plugged directly into a standard duplex outlet of an existing circuit. The apparatus includes circuitry that automatically tests the operability of the device when it is plugged into a duplex outlet without the need for manual manipulation of test buttons or other overt action by the user.

6 Claims, 2 Drawing Sheets

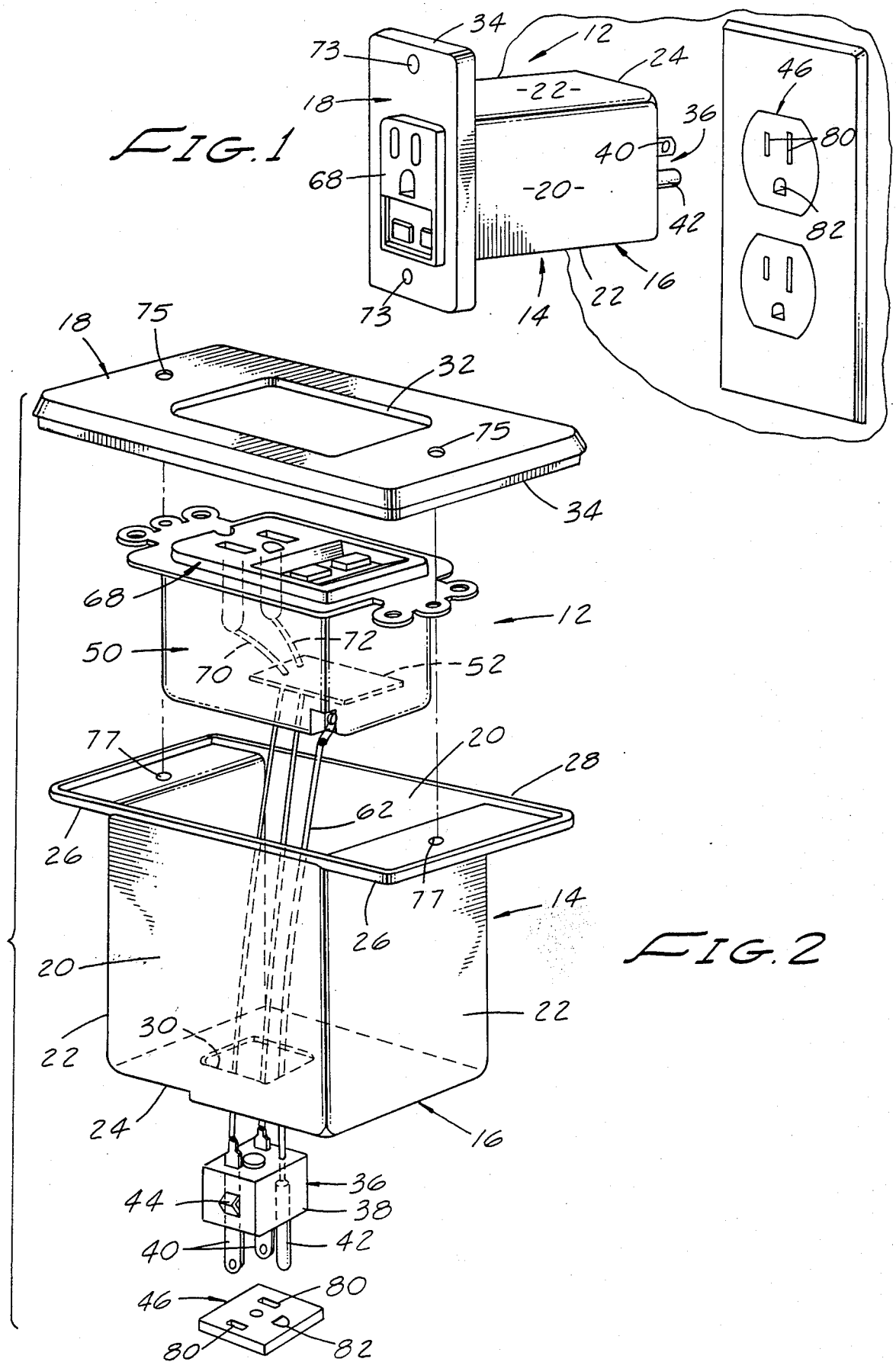

GROUND LINE FAULT INTERRUPTER ADAPTER UNIT

BACKGROUND OF THE INVENTION

1. Field of the Invention

The present invention relates generally to electrical safety devices. More particularly the invention concerns an adapter unit comprising a moisture resistent housing within which is carried an improved, self testing ground line fault interrupter device. The improved device is electrically interconnected with a connector carried externally of the adapter housing so that the unit can be plugged directly into a standard duplex outlet of an existing circuit.

2. Discussion of the Prior Art

The possibility of serious injury which is inherent in the operation of electrical systems has led to the design of various types of protective devices. Among these are the class of electrical apparatus which has come to be known as line fault, or ground fault circuit interrupters (GFI). In general, such devices sense a condition in a line carrying electrical current which indicates a presently or imminently dangerous condition, such as the presence of a current path other than the intended path of normal operation. Response to the sensed dangerous condition typically results in opening the line, that is interrupting the circuit, between the source of power and the load.

In the past GFI equipment has been designed for mounting in a conventional circuit breaker panel box at the input to the electrical distribution system of a building. More recently GFI circuitry has been incorporated in portable boxes or housings having outwardly extending receptacle blades or prongs enabling detachable interconnection of the device with standard duplex outlets. U.S. Pat. No. 4,079,344 issued to Laubin, et al is exemplary of this latter type device.

As a general rule the prior art GFI devices include means for testing the operability of the device. Typically such devices are provided with manually activated "test" and "reset" switches which are operable when the device is interconnected within the circuit to test the integrity of the GFI device. One such prior art device is disclosed in U.S. Pat. No. 4,568,997 issued to Bienwald et al.

A substantial drawback of many of the portable prior art GFI devices is that the device is capable of conducting an electrical current even though it is defective and incapable of sensing a dangerous condition and properly interrupting the circuit. Accordingly, if the operator fails to test the device before using it, the device may appear to be functioning properly, but in fact offers no protection at all for a dangerous fault condition which may exist.

The improved apparatus of the present invention overcomes this serious drawback of the prior art devices by providing circuitry which automatically tests the device when it is plugged in to the house circuit by generating a simulated fault condition at the start of operation. With this unique construction, the device is automatically tested each time it is plugged into a duplex outlet without the operator performing any type of manual test. The device also includes the normal "test" and "reset" capability so that it can also be manually tested at any time.

SUMMARY OF THE INVENTION

It is the object of the present invention to provide an adapter unit embodying an improved ground fault circuit interrupter device which can be plugged into any existing duplex outlet and instantly automatically test itself for operability and thereby make that outlet the equivalent of a hard wired, fully GFI protected outlet.

It is another object of the invention to provide an adapter unit of the character described in the preceding paragraph which includes circuitry that automatically tests the operability of the device when it is plugged into a duplex outlet without the need for manual manipulation of test buttons or other overt action by the user.

Another object of the invention is to provide a device of the aforementioned character which can quickly and easily be installed and used by unskilled persons following very simple instructions.

Still another object of the invention is to provide an adapter unit of the class described that is protected against moisture and is safe for use in all normal applications.

A further object of the invention is to provide an adapter unit of the character described which is of very simple construction, is extremely compact and is highly reliable in everyday use.

BRIEF DESCRIPTION OF THE DRAWINGS

FIG. 1 is a generally perspective view of the ground fault interrupter adapter unit of the present invention in position for interconnection with a duplex outlet.

FIG. 2 is a generally perspective, exploded view illustrating the electrical interconnections among the component parts of the adapter unit.

DETAILED DESCRIPTION OF THE INVENTION

Figure 3:
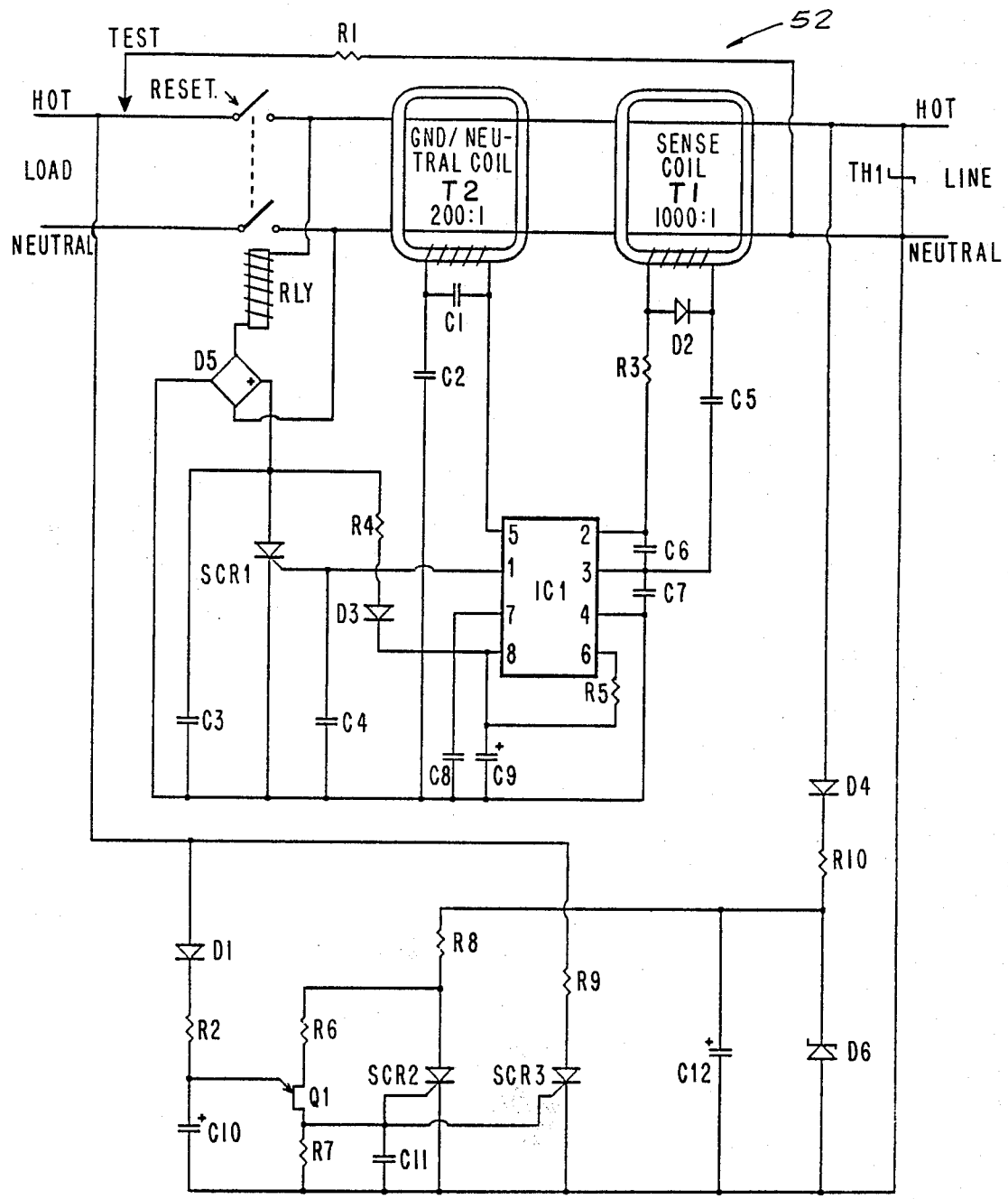
FIG. 3 is a schematic circuit diagram of the ground line fault interrupter of the present invention.

Referring to the drawings and particularly to FIGS. 1 and 2, the ground line fault interrupter adapter unit of the present invention is generally designated by the numeral 12. As best seen in FIG. 2, the apparatus of the present form of the invention comprises a housing 14 which includes a hollow body portion 16 and a closure wall, or top, 18 which can be removably interconnected with the hollow body portion to partially close an open first side thereof and to seal against moisture entering the interior of the hollow body.

Referring particularly to FIG. 2, hollow body portion 16 comprises interconnected side, end and bottom walls 20, 22 and 24, respectively. End walls 22 are provided proximate their upper ends with outwardly extending flanges 26 and the entire upper portion of hollow body 16 is circumscribed by an upstanding flange 28. Bottom wall 24 is provided with an aperture 30 which is substantially rectangular in shape. Closure wall, or top, 18 is also provided with a generally rectangularly shaped aperture 32, the purpose of which will presently be described. Closure, or top, member 18 is also provided with a downwardly depending flange 34 which circumscribes the closure member and cooperates with flange 28 of hollow body 16 to form a moisture-tight seal between the closure member 18 and the top portion of hollow body 16.

A first connector means, provided here in the form of a male plug 36, is mounted within opening 30 provided in bottom wall 24 of the hollow body. Plug 36 includes a molded rubber or plastic body 38 within which is embedded a pair of spaced apart male connector prongs 40 and a ground terminal 42. Plug 36 is of standard construction and is readily commercially available. A pair of spring clips 44 are affixed to the sides of the plug 36 so as to enable it to be securely positioned within aperture 30 of wall 24 of the hollow body of the housing. As indicated in FIG. 1, the plug 36 is adapted to be received in a receptacle 46 of standard construction and of the character found in residences, offices and like facilities.

An improved ground line fault interrupter unit 50 is carried within housing 14. Unit 50 comprises a novel circuit carried within housing 50 and is represented in the drawings by a printed circuit board 52. Circuit 52 functions to interrupt the flow of current in the electrical circuit when a predetermined differential in current occurs between the line and neutral conductors of the electrical circuit into which plug 36 is electrically connected. The circuit also includes means for automatic testing of the integrity of the device. The details of the circuit of the present form of the invention will presently be described. It is to be understood that the physical embodiment of the circuit can take various forms and the circuit board arrangement shown in the drawings is merely exemplary.

The ground line fault interrupter unit 50 also includes second connector means for interconnection with an electrical load, as, for example, an electrical appliance which is electrically coupled with the unit 50. In the form of the invention shown in the drawings, this second connector means is provided as a part of the GFI unit in the form of a female duplex receptacle assembly 68 which is accessible through aperture 32 provided in top closure wall 18. Duplex receptacle assembly 68 is of standard construction and is adapted to accept male plugs of the character typically provided on electrically powered appliances such as hair dryers, power tools, kitchen appliances and the like.

Providing still another portion of the ground fault interrupter unit of the character used in the adapter unit of the present invention are second conductor means for operably interconnecting the second connector means, or duplex outlet, 68 with the circuit 52. These second conductor means are here provided in the form of conduits or wires 70 and 72, respectively (FIG. 2).

Electrical interconnection between the adapter unit of the invention and the receptacle of an external or house circuit is accomplished by inserting the prongs 40 of male plug 36 into female prong receptacles 70 of house receptacle 46. Female prong receptacles 70 are interconnected with the neutral and line side of the house circuit providing power to the house receptacle 46. Also indicated in FIG. 2 is the grounding conductor 62 interconnecting the ground fault interrupter unit 50 and the ground prong 42 of plug 36. Prong 42 is in turn receivable within terminal 72 of receptacle 46 which also is connected to ground.

In practice, hollow body 16 is preferably molded in a single piece from a moldable plastic such as polyethylene and is of a size to closely receive the ground fault interrupter unit 50. Top closure member 18 is also preferably formed of a plastic material in a manner such that the flange 34 thereof is closely receivable over flange 28 which circumscribes body portion 16. When the top closure member 18 is in position over the body portion 16, as shown in FIG. 1, a substantially moisture proof interconnection is achieved between the parts so that ground fault interrupter unit 50 will be protected from exposure to moisture in the environment wherein the adapter is used. In the manufacture of both the hollow body 16 and the top closure member 18 the apertures therein, 30 and 32, are carefully dimensioned so as to closely receive male plug 36 and duplex receptacle 68 respectively so as to once again seal against moisture external of the unit from reaching the interior of the housing. Once the top closure member 18 is mateably interconnected with body portion 16, the parts are held in an assembled relationship by means of connectors such as rivets 73 which are receivable within spaced apertures 75 formed in top member 18 and apertures 77 formed in flange portions 26 (FIG. 2). These connectors, or rivets, 73 function to hold closure member 18 in rigid sealable interconnection with hollow body 16.

The ground line fault interrupter circuit 52 of the present invention is shown in FIG. 3. The current through the lines is sensed by a sense coil in transformer T1 and compared to the ground neutral coil in the transformer T2 output. In practice and operation the currents induced in coils T1 and T2 are equal and opposite in direction so that no current is induced in the secondary windings. When a leakage current develops in the load there will be an induced current in the secondary windings of T2 as a result of a change in the net magnetic field produced by an imbalance in the currents induced in the primary windings of the Transformers T1 and T2. The induced current imbalance in the primary winding of T1 is stepped down in the secondary windings (shown schematically) and conducted to input terminal 3 of integrated circuit IC1 through capacitor C5. Capacitors C6 and C7 connected to input terminals 2 and 3 and to the line connecting C5 and input terminal 3 are provided in the circuit to provide improved noise immunity.

Capacitor C8 is connected in the line connecting input terminal 7 to filter the ripple of the supply voltage and peak current. Capacitor C9 is provided as a timing capacitor in the circuit containing resistor R5 as shown. The values selected for capacitor C9 and resistor R5 establishes the sensitivity of the fault detector to changes in current. When a leakage current is present, the induced current, as described, charges the timing capacitor C9 to a predetermined level for triggering SCR1 through a connection to input terminal 1 of IC1. The triggering forces the anode of SCR1 to a low potential permitting a large current flow through the relay (RLY). A full wave bridge rectifier D5 along with resistor R4 and D3 is arranged, as shown, to provide D.C. power to IC1.

An important aspect of the present invention is the provision of circuitry which automatically tests the ground line fault interrupter by generating a simulated fault condition at the start of circuit operation. This is accomplished by providing a diode D4 and a resistor R10 in a line from the hot line to rectify the line voltage and feed a proportional current to a zener diode D6 which provides the D.C. supply voltage for this part of the circuit. Capacitor C12 is provided for filtering the voltage ripple in the power supply.

In operation, the load voltage is taken through diode D1 and resistor R2, and the capacitor C10 timing circuit to charge the capacitor C10 to the firing voltage of a unijunction lateral transistor ("u.j.t.") Q1, which is configured here as a relaxation oscillator. The preselected time delay for the rise in the capacitor C10 potential to the firing voltage of the u.j.t. then triggers the gates of the semiconductors SCR2 and SCR3. As semiconductor SCR3 conducts, its anode is taken to a low potential which permits current to flow from the hot terminal of the load, through resistor R9 to the neutral terminal thus providing a fault condition which initiates the proper operation of the fault interrupter circuit.

The tripper pulse generated by the u.j.t. also turns on the semiconductor SCR2 which causes its anode to drop to a low potential and effectively removes power from the u.j.t. time delay circuit preventing further trigger pulses from being generated.

The following table of components are utilized with the parts numbers and values listed.

TABLE I

| | | |
|---|---|---|
| Capacitors | | |
| C1 | .1 nF | |
| C2 | 10 nF | |
| C3 | .01 uF/400 V | |
| C4 | 10 nF | |
| C5 | 10 uF/6 V | |
| C6 | 3.3 nF | |
| C7 | .0001 uF | |
| C8 | 18 nF | |
| C9 | 1 uF | |
| C10 | 10 uF/16 V | |
| C11 | .1 uF | |
| C12 | 22 uF/16 V | |
| Resistors | | |
| R1 | 15K/.25 W | |
| R2 | 1.2 Meg/.25 W | |
| R3 | 100/.25 W | |
| R4 | 15K/2 W | |
| R5 | 2 Meg/.25 W | |
| R6 | 120/.25 W | |
| R7 | 100/.25 W | |
| R8 | 560/.25 W | |
| R9 | 1k/.5 W | |
| R10 | 5.6K/2 W | |
| Diodes | | |
| D1 | 1N4004 | |
| D2 | 1N4148 | |
| D3 | 1N4004 | |
| D4 | 1N4004 | |
| D5 | 1A200 V | Rectifier Bridge |
| D6 | 15 V/.5 W | Zener |
| Semiconductors | | |
| IC1 | LM1851B | Ground Fault Interrupter |
| Q1 | NTE6401 | Unijunction Lateral Transistor |
| SCR1 | NTE5400 | Silicon Controlled Rectifier |
| SRC2 | NTE5400 | Silicon Controlled Rectifier |
| SCR3 | NTE5400 | Silicon Controlled Rectifier |
| Miscellaneous | | |
| TH1 | | Surge Protector |
| RLY | | Trip Solenoid |
| T1 | | Sense Coil |
| T2 | | Ground/Neutral Coil |

As previously mentioned, circuit 52 can take various physical forms, including a circuit board form, so long as the components of the circuit are physically receivable within hollow body 16 and are appropriately interconnected with plug 36 and 68.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A self-testing ground line fault interrupter circuit for use on power lines containing a neutral line and a phase line comprising:

(a) A ground fault interrupter circuit including resettable coil actuated circuit breaker means having normally closed main contacts;
   (b) circuit means for connecting a load to one side of said contacts;
   (c) power line means including means for connecting the phase line and the neutral line of a lower line to the other side of said contacts;
   (d) means for interrupting the connection between the load and the phase line and the neutral line of a power line by supplying current to the coil of the circuit breaker to open the contacts in response to the presence of preselected current level in the neutral line;
   (e) said interrupting means including transformer means for sensing current imbalances between the phase and neutral lines of said power lines;
   (f) test means for testing the ground fault interrupter circuit including circuit means electrically connected to said power line means for receiving the power line voltage, capacitor means in said circuit means and capable of being charged by the power line voltage;
   (g) first switching means electrically connected to said capacitor means and adapted to be conductive at the preselected voltage of the capacitor means when in a charged condition; and
   (h) second switching means electrically connected between the phase line and neutral line of said power line, said second switching means comprising semiconductor means which are rendered conductive when said first switching means is rendered conductive whereby power line voltage is passed to the neutral line to simulate a ground line fault condition and initiate the function of the ground line fault interrupter circuit to activate circuit breaker means.

2. The self-testing ground fault interrupter of claim 1 wherein said first switching means is also electrically connected to third switching means which is electrically connected to the phase line of said power line, whereby conduction of said first switching means renders said third switching means conductive thereby removing power line voltage from said capacitor means.

3. The self-testing ground line fault interrupter of claim 2 wherein said first switching means is a unijunction transistor 4. The self-testing ground line fault interrupter of claim 3 wherein said second and third switching means are semi-conductors.

5. The self-test circuit for simulating a ground line fault condition comprising:

(a) circuit means for attachment to the phase and neutral lines of an electrical power line; said circuit means including first switching means capable of being rendered conductive in response to a preselected voltage, capacitor means in said circuit for providing such preselective voltage to said first switching means when charged by the power line voltage; and
   (b) second switching means provided to be rendered conductive by said first switching means and connected between the phase line and neutral line of said power line so as to provide a ground line fault condition.

6. The self-test circuit of claim 5 wherein third switching means are provided to interrupt voltage being applied to said first switching means during the charging cycle of said capacitor means.

* * * * *